(12) United States Patent
Liao

(10) Patent No.: US 9,830,207 B2
(45) Date of Patent: Nov. 28, 2017

(54) MESSAGE COMMUNICATION SYSTEM AND OPERATION METHOD THEREOF

(71) Applicants: ThroughTek Technology (ShenZhen) Co., Ltd., Longhua New District, Shenzhen (CN); ThroughTek Co., Ltd., Taipei (TW)

(72) Inventor: Yi-Hung Liao, Taipei (TW)

(73) Assignees: THROUGHTEK TECHNOLOGY (SHENZHEN) CO., LTD., Shenzhen (CN); THROUGHTEK CO., LTD., Taipei (TW)

( * ) Notice: Subject to any disclaimer, the term of this patent is extended or adjusted under 35 U.S.C. 154(b) by 158 days.

(21) Appl. No.: 14/814,880

(22) Filed: Jul. 31, 2015

(65) Prior Publication Data

US 2016/0212112 A1 Jul. 21, 2016

(30) Foreign Application Priority Data

Jan. 15, 2015 (TW) .............................. 104101321 A

(51) Int. Cl.
 *H04L 29/06* (2006.01)
 *G06F 9/54* (2006.01)
(52) U.S. Cl.
 CPC ............ *G06F 9/542* (2013.01); *H04L 63/083* (2013.01); *H04L 63/0815* (2013.01); *H04L 63/101* (2013.01); *H04L 63/205* (2013.01)

(58) Field of Classification Search
 CPC . H04L 63/08; H04L 63/0815; H04L 63/0884; H04L 63/0892; H04L 63/20; H04L 63/205
 See application file for complete search history.

(56) References Cited

U.S. PATENT DOCUMENTS

2013/0311570 A1* 11/2013 Kuo ...................... H04W 4/008
 709/204

* cited by examiner

*Primary Examiner* — Edward Zee
(74) *Attorney, Agent, or Firm* — Juan Carlos A Marquez; Marquez IP Law Office, PLLC

(57) ABSTRACT

An operation method of a message communication system includes the following steps. At least one linking server generates a first login request. A management server generates a first response message according to the first login request. The at least one linking server obtains a service list according to the first response message. At least one remote device generates a second login request. The management server generates a second response message according to the second login request. The at least one remote device obtains a connection list and a permission set according to the second response message. The at least one remote device generates a connection request according the connection list. The at least one linking server generates a third response message according the connection request and the service list. The at least one remote device and linking server generate a connection state according to the third response message.

18 Claims, 6 Drawing Sheets

MESSAGE COMMUNICATION SYSTEM AND OPERATION METHOD THEREOF

CROSS REFERENCE TO RELATED APPLICATION

This application claims the priority benefit of Taiwan Patent Application Serial Number 104101321, filed on Jan. 15, 2015, the full disclosure of which is incorporated herein by reference.

BACKGROUND

Technical Field

This disclosure generally relates to a message communication system and, more particularly, to a message communication system and an operation method thereof.

Related Art

With the advances in the internet technology, many electronic products (such as clients) may connect to the servers through the internet and query the data of the database in the server and may request the server to provide the related services.

However, among most of the current connection methods, the electronic products need to record the domain name or the internet protocol address (IP Address) of the server to connect with the server. Due to the domain name is remembered easily and the internet protocol address is remembered difficultly for user, the users get used to use the domain name for the connection, instead of using the internet protocol address for connection to the internet. This causes the problems for the user. Additionally, since the domain name or the internet protocol address is public information, it is also profiled or damaged by hackers easily, such that the security of data transmission is not enough. Therefore, the connection method between the electronic products and the server needs improvement.

SUMMARY

The disclosure provides a message communication system and an operation method thereof, thereby decreasing the dangerous invasion and increasing security for usage.

The disclosure provides an operation method of a message communication system. The operation method includes the following steps: generating a first login request by at least one linking server; generating a first response message by a management server according to the first login request; obtaining a service list by the at least one linking server according to the first response message; generating a second login request by at least one remote device; generating a second response message by the management server according to the second login request; obtaining a connection list and a permission set by at least one remote device according to the second response message; generating a connection request by the at least one remote device according the connection list; generating a third response message the at least one linking server according the connection request and the service list; and generating a connection state by the at least one remote device and the at least one linking server according to the third response message.

The disclosure further provides a message communication system. The message communication system includes at least one linking server, at least one remote device and a management server. The at least one linking server generates a first login request. The at least one remote device generates a second login request. The management server generates a first response message according to the first login request after the management server receives the first login request, such that the at least one linking server obtains a service list according to the first response message. The management server generates a second response message according to the second login request after the management receives the second login request, such that the at least one remote device obtains a connection list and a permission set according to the second response message. The at least one remote device further generates a connection request according the connection list. The at least one linking server further generates a third response message according the connection request and the service list. The at least one remote device and linking server further generate a connection state according to the third response message.

According to the message communication system and the operation method thereof in the exemplary embodiments, the linking server generates the first login request to obtain the service list from the management server, the remote device generates the second login request to obtain the connection list and the permission set from the management server, and the remote device further generates the connection request to generate a connection state with the linking server. Therefore, the dangerous invasion is decreased and security for usage is increased.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to system and method of operation, may best be understood by reference to the detailed description which follows taken in conjunction with the accompanying drawings in which:

DETAILED DESCRIPTION OF THE EMBODIMENTS

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
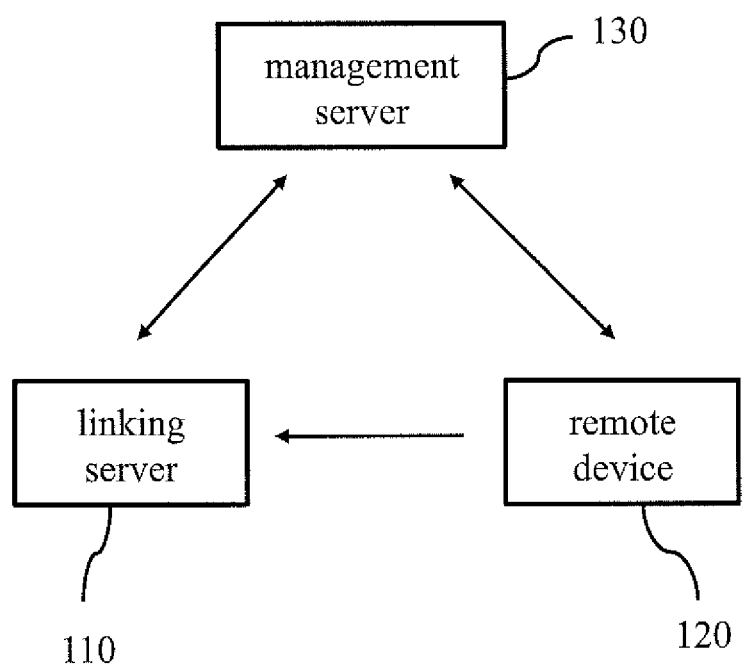
FIG. 1 shows a schematic of the message communication system according to the first exemplary embodiment of the disclosure.

FIG. 1 shows a schematic of the message communication system according to the first exemplary embodiment of the disclosure The message communication system 100 includes a linking server 110, a remote device 120 and a management server 130.

The linking server 110 generates a first login request to request a connection with the management server 130 through an internet network. In the embodiment, the linking server 110 may be, for example, a point-to-point server (P2P server) or a relay server, and the first login request may include, for example, a starting mode set and a first verification code. The starting mode set is used to start the linking server served as the P2P server or the relay server, and the first verification code is, for example, a unique identification code (UID). For example, when the linking server 110 is started, the linking server 110 may obtain a starting parameter, wherein the starting parameter includes the starting mode set and the first verification code. Then, the linking server 110 generates the first login request for requesting to login the management server 130 accordingly. The remote device 120 generate a second login request to request a connection with the management server 130 through an internet network. In the embodiment, the remote device 120 may be, for example, a mobile phone, a computer, or any hardware device equipped with network function, such as IP cam, smart appliance and so on. The second login request may include, for example, a second verification code, and the second verification code is, for example, a unique identification code (UID). For example, the remote device 120 is operated by the user to generate the second login request for requesting to login the management server 130.

The management server 130 generates the first response message according to the first login request, such that the linking server 110 obtains the service list. That is, when the management server 130 receives the first login request, the management server 130 may search, for example, the service list corresponding to the first login request in the database and the service list may be served as the first response message. Then, the management server 130 transmits the first response message to the linking server 110, such that the linking server 110 obtains the service list belong to the linking server 110. The service list is, for example, a white and black list, and it records that the linking server 110 may connect to which remote device, so as to provide the corresponding service.

Additionally, the management server 130 also generates a second response message according to the second login request, such that the remote device 130 obtains a connection list and a permission set. That is, when the management server 130 receives the second login request, the management server 130 may search, for example, the connection list and the permission set corresponding to the second login request in the database, and the connection list and the permission set may be served as the second response message. Then, the management server 130 feeds the second response message to the remote device 120, such that the remote device 120 obtains the connection list and the permission set belong to remote server 120. The connection list records that, for example, the remote device 120 may connect to which linking server device, so as to obtain the corresponding service. The permission set records that, for example, the remote device 120 may use which functions.

After the remote device 120 obtains the connection list, the remote device 120 further generates a connection request according to the connection list, so as to request to link the linking server 110 and report to the linking server 110. The connection request may include, for example, a third verification code, and the third verification code is, for example, a unique identification code (UID) of the remote device 120.

When the linking server 110 receives the above-mentioned connection request, the linking server 110 further generate a third response message according to the connection request and the service list. That is, the linking server 110 may confirms, for example, whether the third verification code of the connection request is stored in the service list, so as to generate the third response message for confirming success and fail.

Afterward, the remote device 120 and the linking server 110 may generate a connection state. The connection state may include, for example, a start connection state and a stop connection state. The start connection state corresponds to the third response message for confirming success, and the stop connection state corresponds to the third response message for confirming fail.

Therefore, the remote device 120 and the linking server 110 are connected without directly obtaining the domain name, so as to decrease dangerous invasion and increase security for usage.

In whole operation, firstly, when the linking server 110 is initially started, the linking server 110 obtains the starting parameter set in the linking server 110, and the starting parameter includes the start mode set and the first verification code. Then, the linking server 110 generates the first login request corresponding to the start mode set and the first verification code according to the starting parameter.

When the management server 130 receives the first login request, the management server 130 may compare the first verification code of the first login request with a first predetermined verification code. The first predetermined verification code is, for example, stored in the database of the management server 130. That is, the management server 130 may verify whether the first verification code transmitted by the linking server 110 is legal, i.e. the management server 130 confirms whether the first verification code exists or already becomes overdue.

When the first verification code conforms with the first predetermined verification code, it means that the first verification is legal, the management server 130 generates a login successful message and search the service list corresponding to the first login request, and the login successful message and the service list may be served as the first response message and sent to the linking server 110. When the linking server 110 receives the login successful message and the service list included in the first response message, the linking server 110 obtains the service list according to the first response message and records the service list, and the linking server 110 starts to operate.

On the other hand, when the first verification code does not conform with the first predetermined verification code, it means that the first verification code is not legal. The management server 130 may generate a login failed message served as the first response message and send the first response message to the linking server 110. When the linking server 110 receives the login failed message included in the first response message, the linking server 110 records a related datum corresponding to the login failed message and stop connecting to the management server 130.

When the user intends to connect the remote device 120 to the management server 130, the user may operate the remote device 120 to generate the second login request, wherein the second login request may include, for example, the second verification code.

When the management server 130 receives the second login request, the management server 130 may compare the second verification code of the second login request with a second predetermined verification code. The second predetermined verification code is, for example, stored in the database of the management server 130. That is, the management server 130 may verify whether the second verification code transmitted by the remote device 120 is legal, i.e. the management server 130 confirms whether the second verification code exists or already becomes overdue.

When the second verification code conforms with the second predetermined verification code, it means that the second verification code is legal, the management server 130 may generate a login successful message and search the connection list and the permission set corresponding to the second verification code, and the login successful message, the connection list and the permission set may be served as the second response message and sent to the remote device 120. When the remote device 120 receives the login successful message, the connection list and the permission set included in the second response message, the remote device 120 obtains the connection list and the permission set according to the second response message and records the connection list and the permission set, such that the user knows that the remote device 120 may connect to which linking server and the functions of which functions can be used.

On the other hand, when the second verification code does not conform with the second predetermined verification code, it means that the second verification code is not legal. The management server 130 may generate a login failed message served as the second response message and send the second response message to the remote device 120. When the remote device 120 receives the login failed message included in the second response message, the remote device 120 stops connecting to the management serve 130.

When the remote device 120 obtains the connection list, the remote device 120 may generate, for example, a connection request for requesting to connect to the linking server 110 and report to the linking server 110 and further obtain the corresponding service. The connection request may include, for example, a third verification code, and the third verification code is, for example, the UID of the remote device 120.

When the linking server 110 receives the connection request, the linking server 110 may confirm whether the third verification code conforms with the third predetermined verification code. That is, the linking server 110 may confirm whether the remote device 120 operates with the linking server 110, i.e. the linking server 110 confirms whether the third verification code is in the black list or the white list.

When the third verification code conforms with the third predetermined verification code, it means that the third verification code is in the white list and the remote device 120 may operates with the linking server 110, the linking server 110 may generate a confirmation successful message served as the third response message and send the third response message to the remote device 120. When the remote device 120 receives the confirmation successful message included in the third response message, the remote device 120 may start connecting to the linking server 120, i.e. the remote device 120 and the linking server 120 generate the starting connection state.

When the third verification code does not conform with the third predetermined verification code, it means that the third verification code is in the black list and the remote device 120 may not operate with the linking server 110. The linking server 110 may generate a confirmation failed message served as the third response message and send the third response message to the remote device 120. When the remote device 120 receives the confirmation failed message included in the third response message, the remote device 120 stops connecting to the linking server 110.

Further, after the linking server 110 transmits the first login request to the management server 130, the linking server 110 may, for example, start to count. After a predetermined time, the linking server 110 may generate the first login request to the management server 130 and login the management server 130 again. Therefore, the situation that the management server 130 crashes or the data obtained by the link server 110 is wrong or old when there is data update in the management server 130 may be avoided.

In the above-mentioned description, the amount of the linking server 110 and the remote device 120 is, for example, one, and it is not limited to the disclosure. The amount of the linking server 110 and the remote device 120 may be, for example, two or more than two. When the amount of the linking server 110 and the remote device 120 are two or more than two, the embodiment may refer to the above-mentioned description and the description is omitted.

Additionally, when the management server 130 receives the second login request and determines the second verification code in the second login request is legal, the management server 130 may provide a use interface to the remote device 120, such that the user may adjust the permission set corresponding to the second verification code through the use interface to achieve a purpose for adjusting the service. The management server 130 may store the permission set adjusted by the user and update the database thereof accordingly, and send the adjusted permission set to the remote device 120 so as to provide a reference for user. In the embodiment, the user may include, for example, a service provider or a customer.

Further, when the user is the service provider, the permission set of the use interface provided by the management server 130 may not be modified by the customer, and it must be modified by the service provider. When the customer wants to change the permission set, the customer needs to pay the money to the service provider, and then the service provider modifies the permission according to a requirement of the customer.

When the remote device 120 obtains the permission set from the management server 130, the remote device 120 may execute at least one corresponding assigned function directly according to the permission set. That is, if the user wants to use the assigned function, the remote device 120 may determine whether the assigned function includes the permission according to the permission set, so as to perform the corresponding process. For example, if the amount of the assigned function is five, when the permission set of the assigned function includes three permissions for using and two permissions for not using, the remote device 120 directly executes three assigned functions with the permission for using and does not execute two assigned functions with the permission for not using.

When the permission set of the assigned function includes four permissions for using and one permission for not using, the remote device 120 directly executes four assigned functions with the permission for using and does not execute one assigned function with the permission for not using. The other embodiments are similar to the previous ones, and the description may be referred to the previous embodiment. The remote device 120 already equips with all the assigned functions (i.e. the above-mentioned five assigned functions) and does not download corresponding assigned function again according the adjustment of the permission set. That is, when the amount of the permission for using is adjusted to four from three, the remote device 120 does not need to download the new assigned function with permission for using and then directly executes this new assigned function.

Additionally, if the user is the service provider, when the customer obtains the permission set from the service provider, the customer also downloads and stores all the assigned functions (i.e. the above-mentioned five assigned functions) provided by the service provider. The customer does not download corresponding assigned function again according the adjustment of the permission set. The description that the customer directly executes the at least one corresponding assigned function according to the permission set may be referred to the above-mentioned description and the description is omitted.

Figure 2:
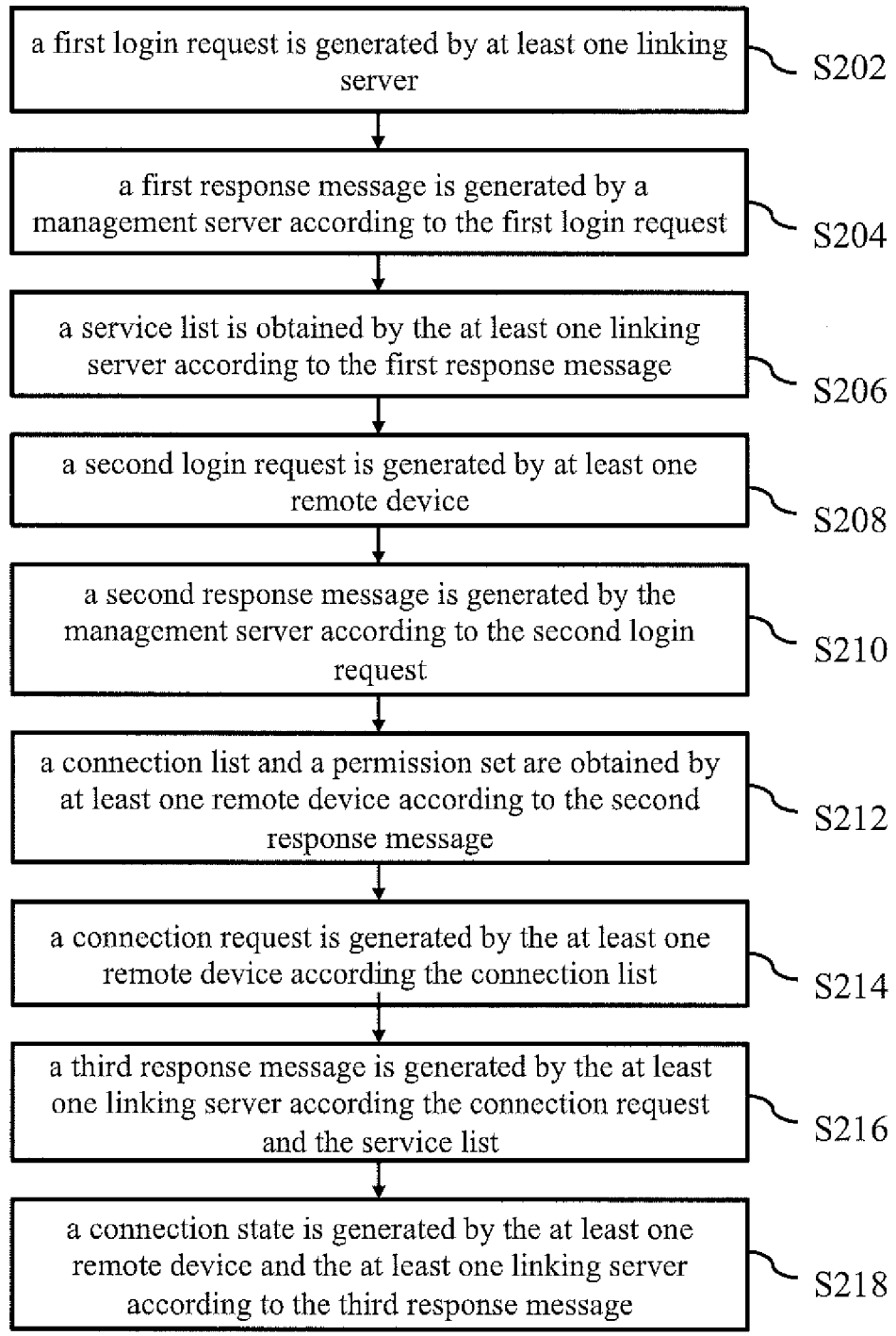
FIG. 2 shows a flowchart of the operation method of the message communication system according to the second exemplary embodiment of the disclosure.

According to the above-mentioned description, there is an operation method of the message communication system. FIG. 2 shows a flowchart of the operation method of the message according to the second exemplary embodiment of the disclosure.

In the step S202, a first login request is generated by at least one linking server. In the step S204, a first response message is generated by a management server according to the first login request. In the step S206, a service list is obtained by the at least one linking server according to the first response message.

In the step S208, a second login request is generated by at least one remote device. In the step S210, a second response message is generated by the management server according to the second login request. In the step S212, a connection list and a permission set are obtained by at least one remote device according to the second response message.

In the step S214, a connection request is generated by the at least one remote device according the connection list. In the step S216, a third response message is generated by the at least one linking server according the connection request and the service list. In the step S218, a connection state is generated by the at least one remote device and the at least one linking server according to the third response message. In the embodiment, the first login request may include, for example, a starting mode set and a first verification code, the second login request may include, for example, a second verification code, and the connection request may include, for example, a third verification code.

Figure 3:
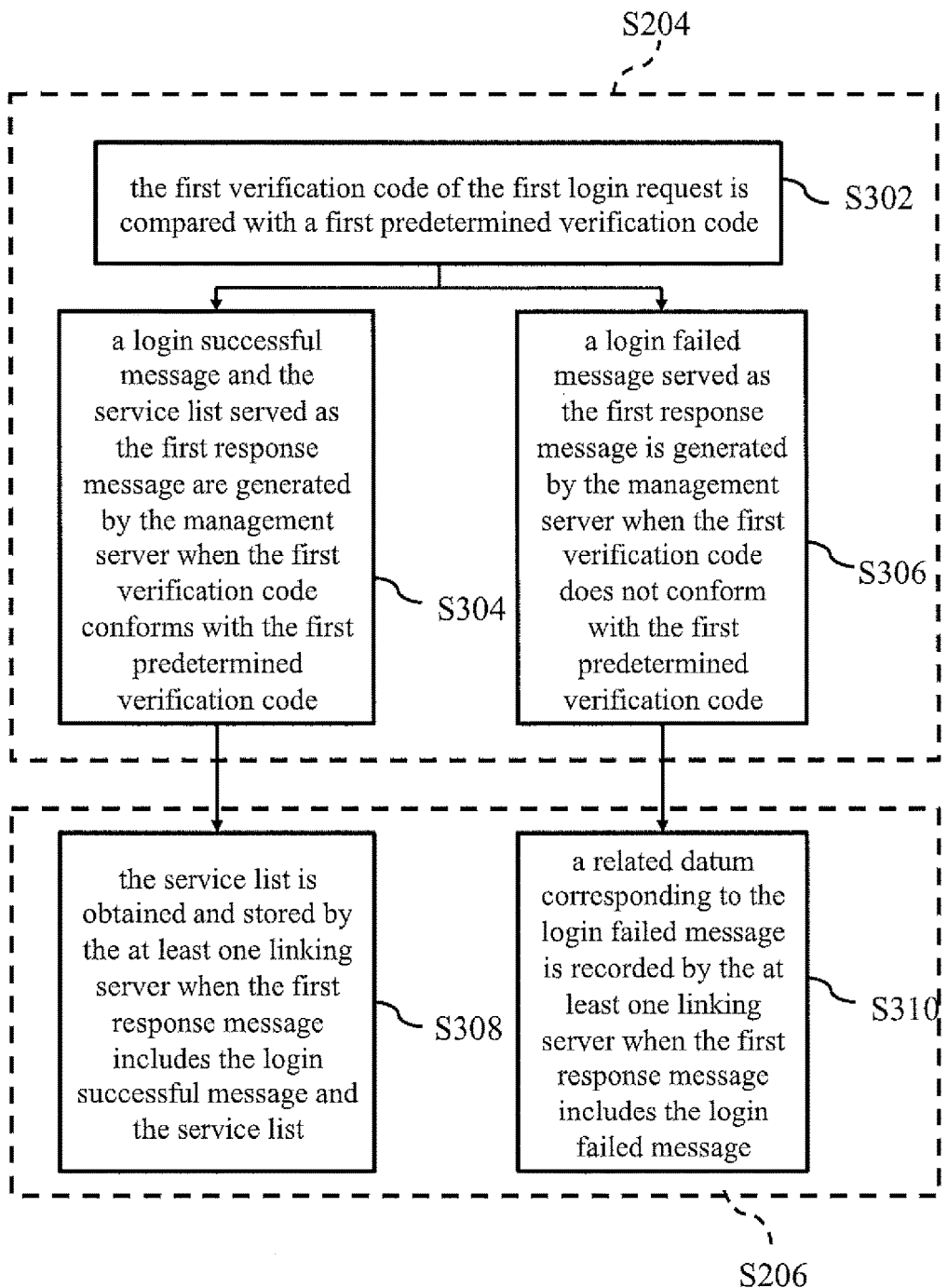
FIG. 3 shows a detailed flowchart of the steps S204 and S206 in FIG. 2.

FIG. 3 shows a detailed flowchart of the steps S204 and S206 in FIG. 2. In the step S302, the first verification code of the first login request is compared with a first predetermined verification code. In the step S304, a login successful message and the service list served as the first response message are generated by the management server when the first verification code conforms with the first predetermined verification code. In the step S306, a login failed message served as the first response message is generated by the management server when the first verification code does not conform with the first predetermined verification code.

In the step S308, the service list is obtained and stored by the at least one linking server when the first response message includes the login successful message and the service list. In the step S310, a related datum corresponding to the login failed message is recorded by the at least one linking server when the first response message includes the login failed message.

Figure 4:
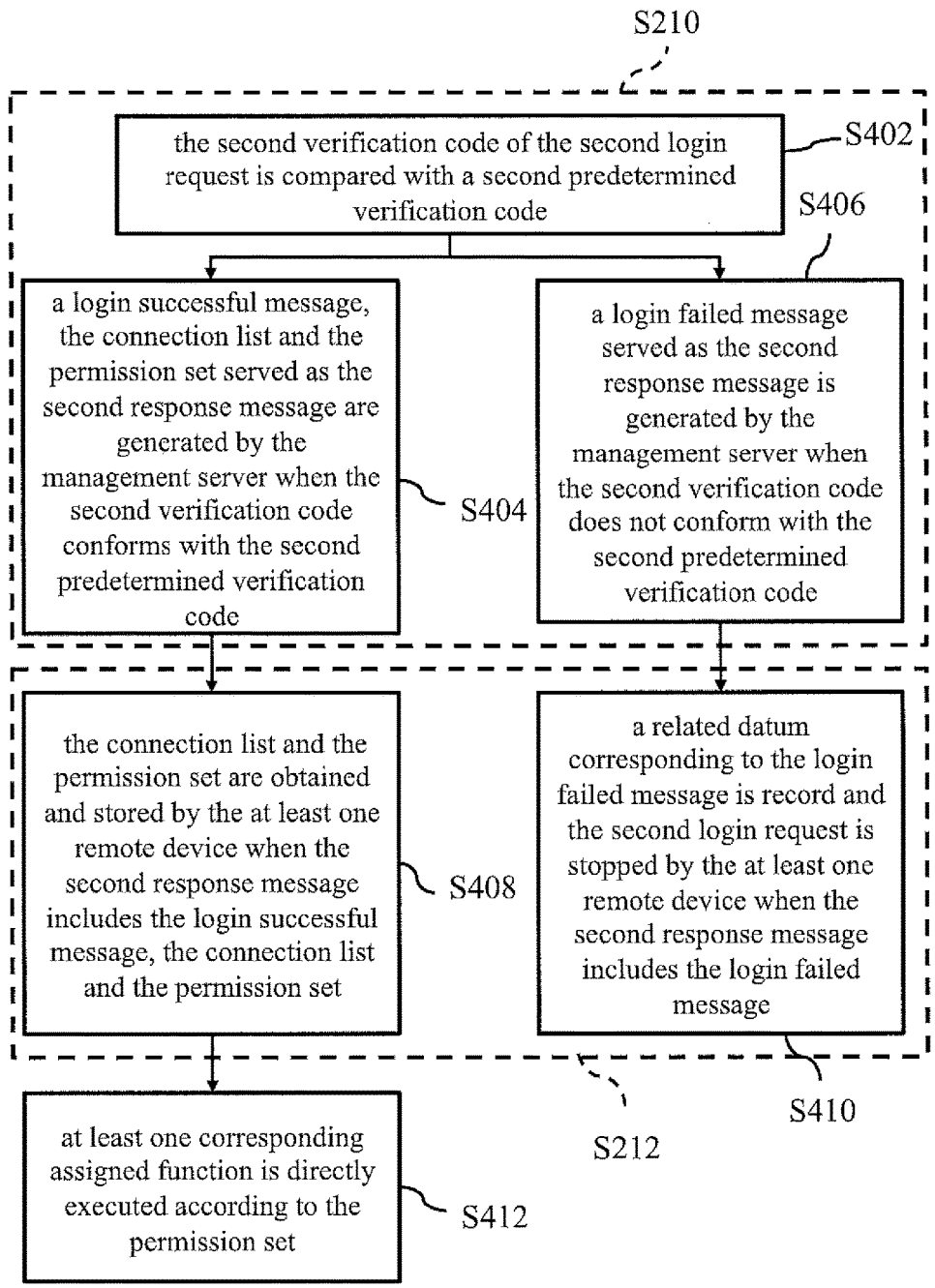
FIG. 4 shows a detailed flowchart of the steps S210 and S212 in FIG. 2.

FIG. 4 shows a detailed flowchart of the steps S210 and S212 in FIG. 2. In the step S402, the second verification code of the second login request is compared with a second predetermined verification code. In the step S404, a login successful message, the connection list and the permission set served as the second response message are generated by the management server when the second verification code conforms with the second predetermined verification code. In the step S406, a login failed message served as the second response message is generated by the management server when the second verification code does not conform with the second predetermined verification code.

In the step S408, the connection list and the permission set are obtained and stored by the at least one remote device when the second response message includes the login successful message, the connection list and the permission set. In the step S410, a related datum corresponding to the login failed message is record and the second login request is stopped by the at least one remote device when the second response message includes the login failed message. In the step S412, at least one corresponding assigned function is directly executed according to the permission set.

Figure 5:
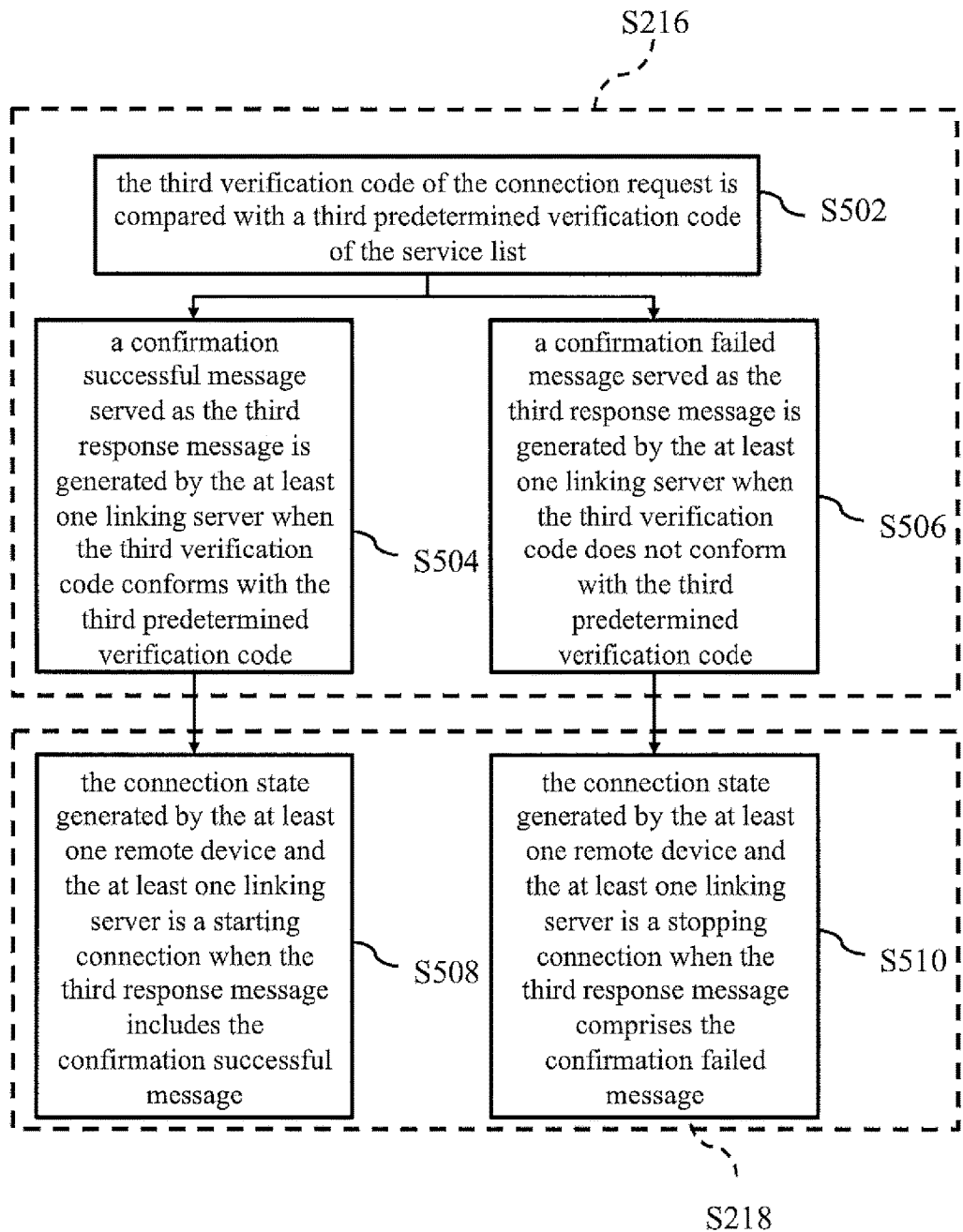
FIG. 5 shows a detailed flowchart of the steps S216 and S218 in FIG. 2.

FIG. 5 shows a detailed flowchart of the steps S216 and S218 in FIG. 2. In the step S502, the third verification code of the connection request is compared with a third predetermined verification code of the service list. In the step S504, a confirmation successful message served as the third response message is generated by the at least one linking server when the third verification code conforms with the third predetermined verification code. In the step S506, a confirmation failed message served as the third response message is generated by the at least one linking server when the third verification code does not conform with the third predetermined verification code.

In the step S508, the connection state generated by the at least one remote device and the at least one linking server is a starting connection when the third response message includes the confirmation successful message. In the step S510, the connection state generated by the at least one remote device and the at least one linking server is a stopping connection when the third response message comprises the confirmation failed message.

Figure 6:
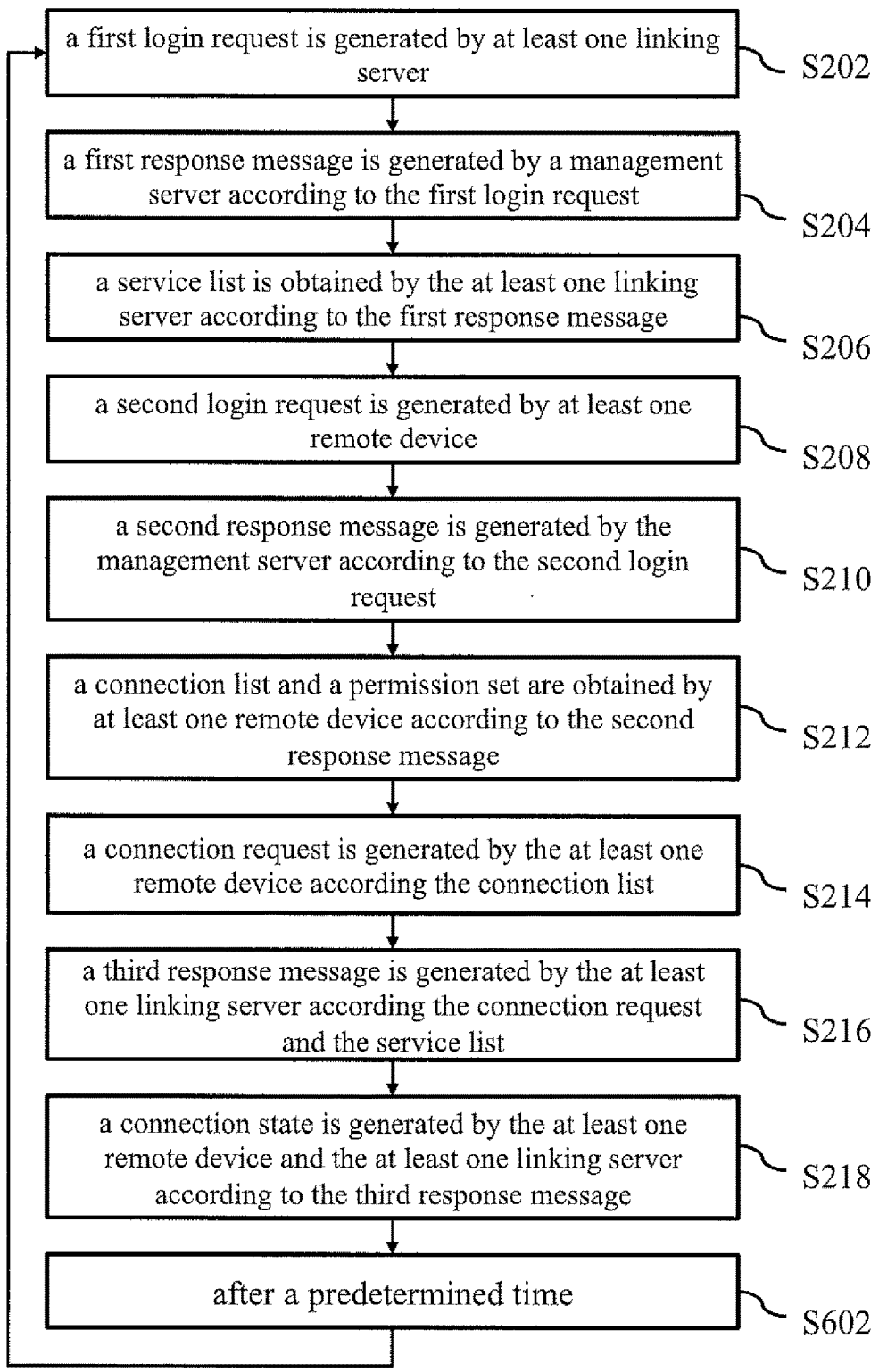
FIG. 6 shows a flowchart of the operation method of the message communication system according to the third exemplary embodiment of the disclosure.

FIG. 6 shows a flowchart of the operation method of the message communication system according to the third exemplary embodiment of the disclosure. In the step S202, a first login request is generated by at least one linking server. In the step S204, a first response message is generated by a management server according to the first login request. In the step S206, a service list is obtained by the at least one linking server according to the first response message.

In the step S208, a second login request is generated by at least one remote device. In the step S210, a second response message is generated by the management server according to the second login request. In the step S212, a connection list and a permission set are obtained by at least one remote device according to the second response message.

In the step S214, a connection request is generated by the at least one remote device according the connection list. In the step S216, a third response message is generated by the at least one linking server according the connection request and the service list. In the step S218, a connection state is generated by the at least one remote device and the at least one linking server according to the third response message. In the step S602, after a predetermined time and the process goes to the step S202, the first login request is generated to the management server by the at least one linking server again.

According to the message communication system and operation method thereof of the above-mentioned embodiments, the linking server generates the first login request to obtain the service list from the management server, the remote device generates the second login request to obtain the connection list and the permission set from the management server, and the remote device further generates the connection request to generate a connection state with the linking server. Therefore, the dangerous invasion is decreased and security for usage is increased.

Although the disclosure has been explained in relation to its preferred embodiment, it does not intend to limit the disclosure. It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. An operation method of a message communication system, comprising:
   generating a first login request by at least one linking server;
   generating a first response message by a management server according to the first login request;
   obtaining a service list by the at least one linking server according to the first response message;
   generating a second login request by at least one remote device;
   generating a second response message by the management server according to the second login request;
   obtaining a connection list and a permission set by at least one remote device according to the second response message;
   generating a connection request by the at least one remote device according to the connection list;
   generating a third response message by the at least one linking server according to the connection request and the service list; and
   generating a connection state by the at least one remote device and the at least one linking server according to the third response message.

2. The operation method of the message communication system as claimed in claim 1, wherein the first login request comprises a starting mode set and a first verification code, and the step of generating the first response message by the management server according to the first login request comprises:
   comparing the first verification code of the first login request with a first predetermined verification code;
   generating a login successful message and the service list served as the first response message by the management server when the first verification code conforms with the first predetermined verification code; and
   generating a login failed message served as the first response message by the management server when the first verification code does not conform with the first predetermined verification code.

3. The operation method of the message communication system as claimed in claim 2, wherein the step of obtaining a service list by the at least one linking server according to the first response message comprises:
   obtaining and storing the service list by the at least one linking server when the first response message comprises the login successful message and the service list; and
   recording a related datum corresponding to the login failed message by the at least one linking server when the first response message comprises the login failed message.

4. The operation method of the message communication system as claimed in claim 1, wherein the second login request comprises a second verification code, and the step of generating the second response message by the management server according to the second login request comprises:
   comparing the second verification code of the second login request with a second predetermined verification code;
   generating a login successful message, the connection list and the permission set served as the second response message by the management server when the second verification code conforms with the second predetermined verification code; and
   generating a login failed message served as the second response message by the management server when the second verification code does not conform with the second predetermined verification code.

5. The operation method of the message communication system as claimed in claim 4, wherein the step of obtaining the connection list and the permission set by the at least one remote device according to the second response message comprises:
   obtaining and storing the connection list and the permission set by the at least one remote device when the second response message comprises the login successful message, the connection list and the permission set; and
   recording a related datum corresponding to the login failed message and stopping the second login request by the at least one remote device when the second response message comprises the login failed message.

6. The operation method of the message communication system as claimed in claim 5, wherein after the step of obtaining the connection list and the permission set by the at least one remote device according to the second response message further comprises:
   directly executing at least one corresponding assigned function according to the permission set.

7. The operation method of the message communication system as claimed in claim 1, wherein the connection request comprises a third verification code, and the step of generating a third response message the at least one linking server according to the connection request and the service list comprises:
   comparing the third verification code of the connection request with a third predetermined verification code of the service list;
   generating a confirmation successful message served as the third response message by the at least one linking server when the third verification code conforms with the third predetermined verification code; and
   generating a confirmation failed message served as the third response message by the at least one linking server when the third verification code does not conform with the third predetermined verification code.

8. The operation method of the message communication, system as claimed in claim 1, wherein the third response message generated by the at least one linking server is transmitted to the at least one remote device.

9. The operation method of the message communication system as claimed in claim 1, after the step of generating the connection state by the at least one remote device and the at least one linking server further comprising:
generating the first login request to the management server by the at least one linking server after a predetermined time.

10. A message communication system, comprising:
at least one linking server, generating a first login request;
at least one remote device, generating a second login request; and
a management server, generating a first response message according to the first login request after the management server receives the first login request, such that the at least one linking server obtains a service list according to the first response message, and the management server generates a second response message according to the second login request after the management server receives the second login request, such that the at least one remote device obtains a connection list and a permission set according to the second response message;
wherein, the at least one remote device further generates a connection request according to the connection list, the at least one linking server further generates a third response message according to the connection request and the service list, and the at least one remote device and linking server further generate a connection state according to the third response message.

11. The message communication system as claimed in claim 10, wherein the first login request comprises a starting mode set and a first verification code, and the management server compares the first verification code of the first login request with a first predetermined verification code; the management server generates a login successful message and the service list served as the first response message when the first verification code conforms with the first predetermined verification code; the management server generates a login failed message served as the first response message when the first verification code does not conform with the first predetermined verification code.

12. The message communication system as claimed in claim 11, wherein the at least one linking server obtains and stores the service list when the first response message comprises the login successful message and the service list; the at least one linking server records a related datum corresponding to the login failed message when the first response message comprises the login failed message.

13. The message communication system as claimed in claim 10, wherein the second login request comprises a second verification code, and the management server compares the second verification code of the second login request with a second predetermined verification code; the management server generates a login successful message, the connection list and the permission set served as the second response message when the second verification code conforms with the second predetermined verification code; the management server generates a login failed message served as the second response message when the second verification code does not conform with the second predetermined verification code.

14. The message communication system as claimed in claim 13, wherein the at least one remote device obtains and stores the connection list and the permission set when the second response message comprises the login successful message, the connection list and the permission set; the at least one remote device records a related datum corresponding to the login failed message and stops the second login request when the second response message comprises the login failed message.

15. The message communication system as claimed in claim 14, wherein the at least one remote device directly executes at least one corresponding assigned function according to the permission set.

16. The message communication system as claimed in claim 10, wherein the connection request comprises a third verification code, and the at least one linking server compares the third verification code of the connection request with a third predetermined verification code of the service list; the at least one linking server generates a confirmation successful message served as the third response message when the third verification code conforms with the third predetermined verification code; the at least one linking server generates a confirmation failed message served as the third response message when the third verification code does not conform with the third predetermined verification code.

17. The message communication system as claimed in claim 10, wherein the at least one linking server transmits the third response message to the at least one remote device.

18. The message communication system as claimed in claim 10, wherein after the at least one remote device and linking server further generate the connection state, the at least one linking server further generates they first login request to the management server by the at least one linking server after a predetermined time.

* * * * *